United States Patent [19]

Long

[11] 4,186,881

[45] Feb. 5, 1980

[54] IRRIGATION MACHINE

[75] Inventor: William R. Long, Tarboro, N.C.

[73] Assignee: Long Mfg. N. C., Inc., Tarboro, N.C.

[21] Appl. No.: 959,284

[22] Filed: Nov. 9, 1978

[51] Int. Cl.² .................... A01G 25/09; B05B 3/18
[52] U.S. Cl. ................................ 239/198; 137/344;
    137/355.19; 137/355.21; 137/355.26; 242/86.2
[58] Field of Search ............... 239/188, 189, 191, 169,
    239/195–199; 242/86, 86.2, 84.5 R, 84.5 R;
    137/344, 355.19, 355.21, 355.22, 355.26, 355.27,
    355.2

[56] References Cited

U.S. PATENT DOCUMENTS

| | | | |
|---|---|---|---|
| 1,714,713 | 5/1929 | Farley | 239/189 |
| 1,761,191 | 6/1930 | Browning | 239/189 |
| 1,982,610 | 11/1934 | Harris | 137/355.22 |
| 2,518,490 | 8/1950 | Keener | 137/355.2 |
| 3,346,213 | 10/1967 | Nelson | 242/86.2 |
| 3,489,352 | 1/1970 | Diggs | 239/189 |
| 3,545,678 | 12/1970 | Tangeman | 239/169 X |
| 3,684,178 | 8/1972 | Friedlander | 239/189 |
| 3,810,579 | 5/1974 | Di Palma | 239/197 |
| 4,003,519 | 1/1977 | Kruse et al. | 239/195 X |
| 4,012,002 | 3/1977 | McDonald et al. | 242/86 X |

FOREIGN PATENT DOCUMENTS 2609442 9/1977 Fed. Rep. of Germany .......... 239/197
2255010 12/1973 France .................................. 239/189

OTHER PUBLICATIONS

*Junematic Turbo*, Heba Brochure, Jonkoping, Sweden.
Traveling Sprinkler Design Guide, Ag-Rain, Inc. Brochure, Havana, Illinois.
*Hudig* Brochure, Distributed by Complete, Wellpoint and Equipment Service, Port Orange, Florida.
Vermeer Irrigation Systems, Vermeer Manufacturing Company Brochure, Pella, Iowa.

*Primary Examiner*—Robert B. Reeves
*Assistant Examiner*—Andres Kashnikow
*Attorney, Agent, or Firm*—Dowell & Dowell

[57] ABSTRACT

An apparatus for irrigating the earth includes a portable vehicle having a hose reel connected to a supply of water under pressure. An elongated hose is carried by the reel and the end of the hose is connected to a travelling carriage having a water gun and such carriage initially is moved away from the vehicle by an external force after which water passing through the apparatus drives a turbine which rotates the reel and coils the hose thereon while pulling the carriage toward the vehicle at a selected speed so that a large area of the earth is watered automatically.

12 Claims, 12 Drawing Figures

IRRIGATION MACHINE

SUMMARY OF THE INVENTION

The present invention relates generally to apparatus for irrigating the earth and is embodied particularly in an irrigation machine including a portable vehicle on which a reel frame is rotatably mounted and such reel frame rotatably supports a relatively large reel. One end of a hose carried by the reel is supplied with water under pressure from a convenient source and the opposite end of the hose is connected to a water gun supported by a travelling carriage. A portion of the water under pressure may be diverted through a turbine which is connected to drive mechanism for operating the reel so as to coil the hose on the reel and draw the travelling carriage toward the portable vehicle, while water is being discharged from the water gun so that a large area of earth is irrigated automatically. The apparatus is provided with control mechanisms to interrupt the rotation of the reel when travelling vehicle is located adjacent thereto and means is provided to prevent backlash of the reel when the travelling carriage is moved away from the vehicle while the hose is being paid out. Also apparatus is provided for supporting the travelling carriage on the vehicle when the vehicle is being moved from place to place. The reel support frame is rotatably mounted on the vehicle in such a manner that the reel may be rotated to face in a desired direction and adjustable support means is provided for supporting the reel frame in the adjusted position. Additionally means is provided on the travelling carriage to permit limited vertical movement of the water gun, particularly when travelling carriage approaches the vehicle.

It is an object of the invention to provide an irrigation machine of the type which includes a rotatable reel with a hose connected to a source of water under pressure and having a travelling carriage connected to one end of the hose and also having a water drive turbine on the vehicle so that water passing through the hose drives the reel to coil the hose thereon and pull the travelling carriage toward the vehicle at a selected speed so that a large area of earth is irrigated.

Another object of the invention is to provide a drive mechanism for an irrigating reel in which a turbine operates the drive mechanism at a selected speed to coil the hose onto the reel and means is provided for preventing backlash of the reel when the travelling carriage is being moved away from the reel and the hose carried thereby is being paid out.

A further object of the invention is to provide a travelling carriage for an irrigation machine in which the travelling carriage includes a water gun mounted thereon for limited vertical movement to prevent tilting of the water gun when the carriage approaches the reel.

DESCRIPTION OF THE PREFERRED EMBODIMENT

Figure 4:
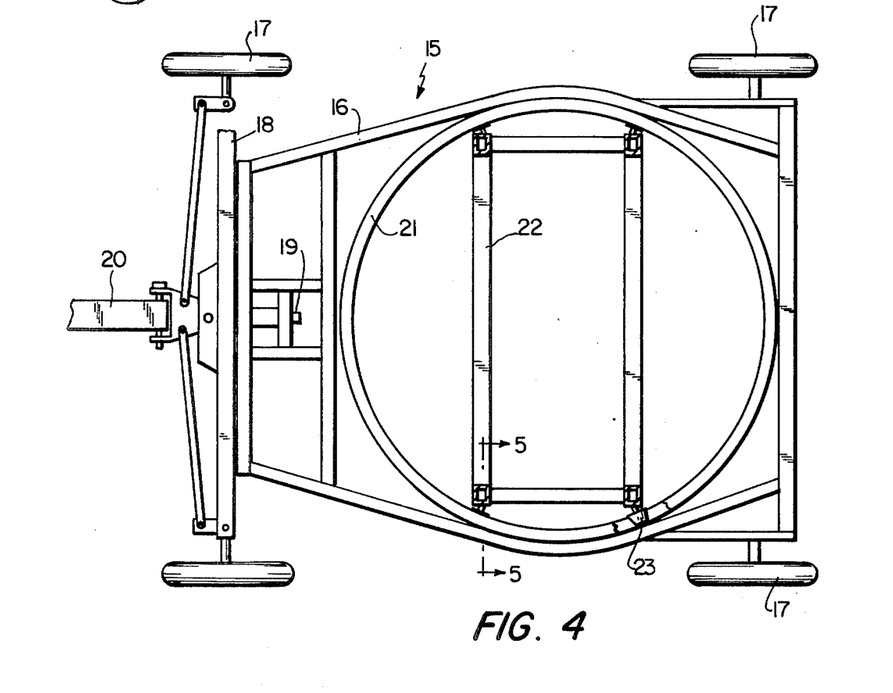
FIG. 4 is a sectional view on line 4—4 of FIG. 2 illustrating the chassis of the portable vehicle.
Figures 5, 9:
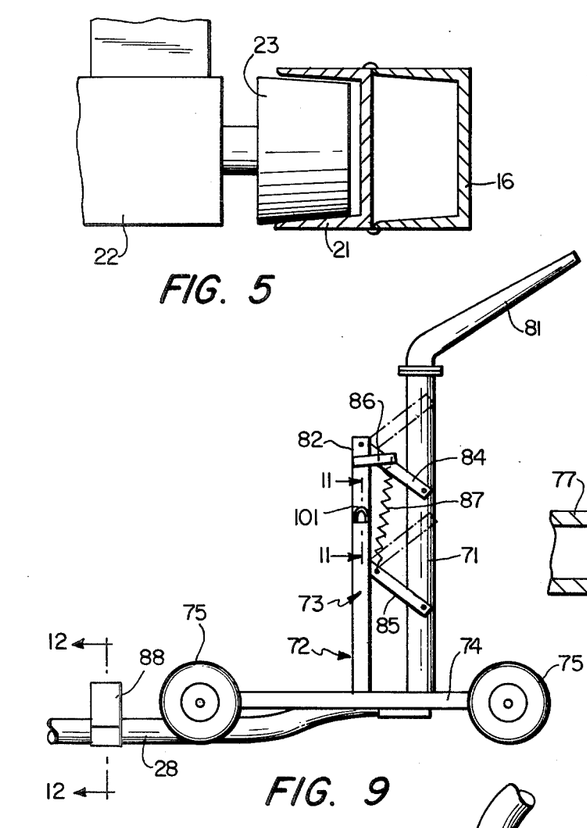
FIG. 5 is an enlarged fragmentary sectional view on the line 5—5 of FIG. 4.
FIG. 9 is a side elevational view of the travelling carriage.
Figure 6:
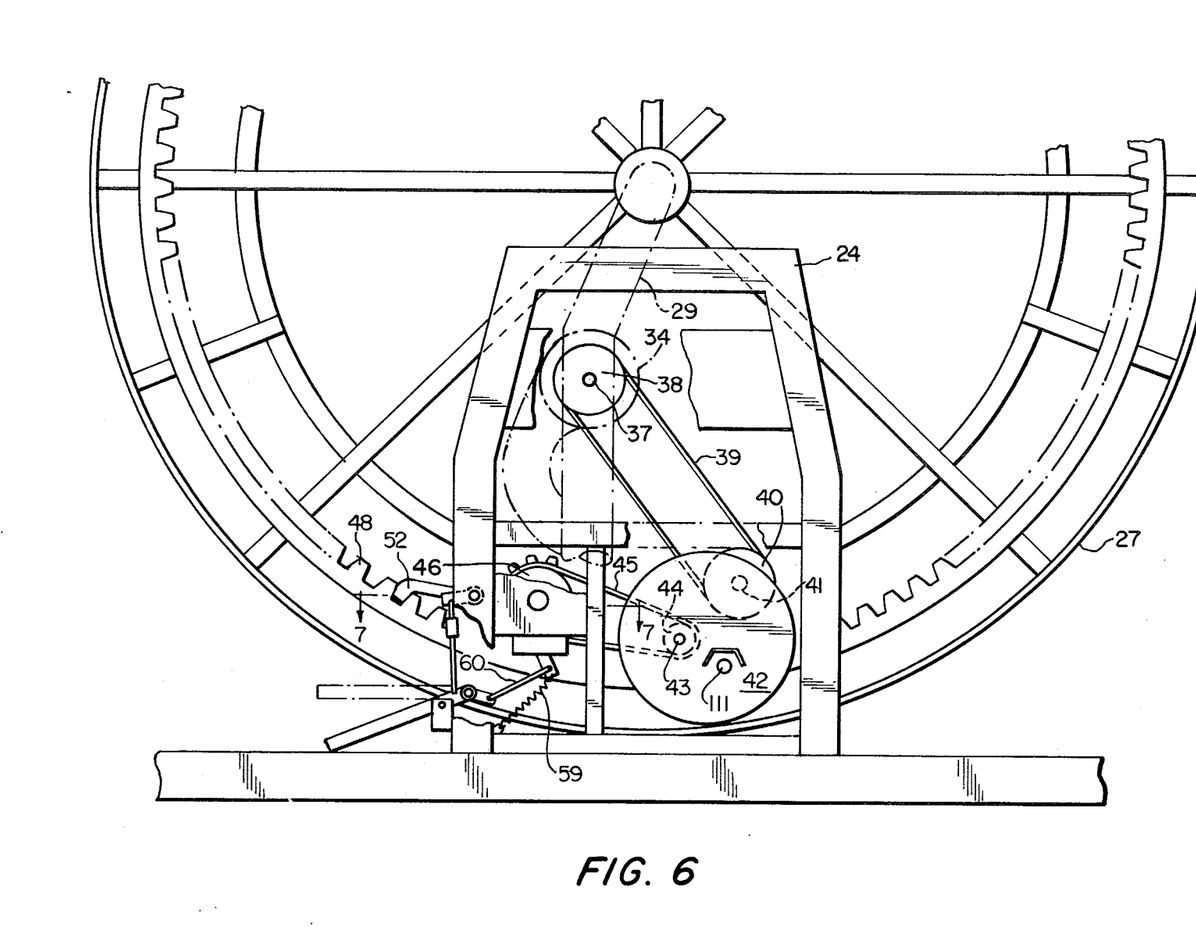
FIG. 6 is an enlarged fragmentary side elevational view illustrating the rotatable reel and the drive mechanism therefor.

With further reference to the drawings, a portable vehicle 15 is provided having a chassis 16 supported by ground-engaging wheels 17. As illustrated best in FIG. 4, the front wheels of the vehicle are steerably mounted on a crossbar 18 which is connected to the chassis 16 by a pivot 19. A tongue 20 is swingably mounted at one end on the crossbar 18 and the opposite end of such tongue is provided with a conventional connection (not shown) to a propelling vehicle.

The chassis 16 includes a generally circular track 21 on which a reel support frame 22 is rotatably mounted by means of rollers 23 which are mounted on the reel support frame and rotatably engage the track 21. A pair of A-frame support members 24 and 25 are mounted on opposite ends of the reel support frame 22 and the upper end of each of such A-frame support members is provided with a bearing which rotatably receives a hollow shaft 26. A relatively large reel 27 is mounted on the shaft 26 and such reel receives an elongated flexible hose 28 one end of which is in communication with the interior of the hollow shaft 26.

In order to supply water to the hollow shaft 26 and the hose 28, one end of the hollow shaft is rotatably connected to a manifold 29 carried by the A-frame support member 24 and the lower end of such manifold is connected to a feed pipe 30. The feed pipe 30 is connected to a conventional source of water under pressure such as a stand pipe 31 having a conventional control valve. It is contemplated that the feed pipe 30 could be connected to a pump (not shown) located adjacent to a pond or other body of water so that the manifold 29 may be supplied with water from any convenient source. Preferably a butterfly valve 32 is disposed within the manifold 29 and is controlled by a handle 33 to regulate the amount of water passing through the manifold to the turbine.

Figure 3:
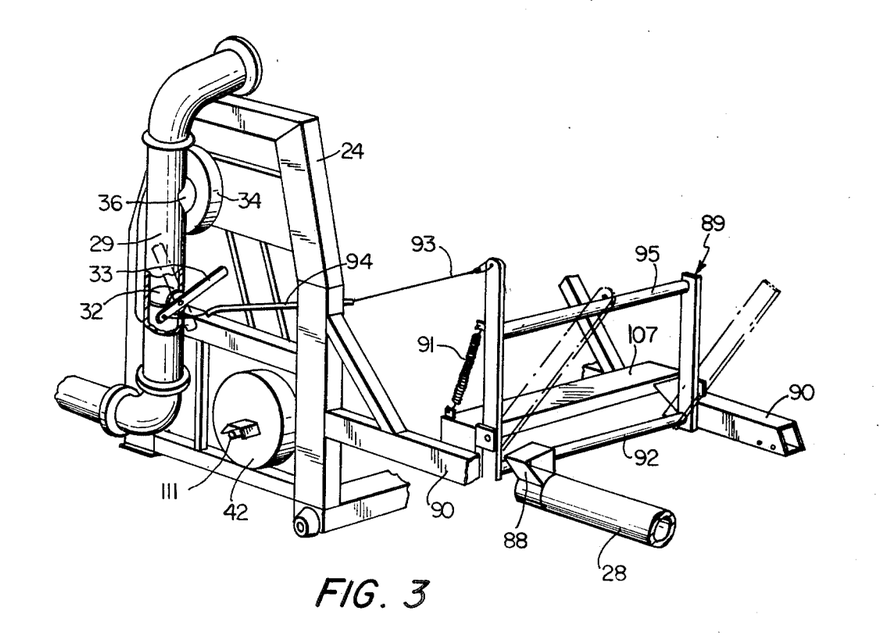
FIG. 3 is an enlarged fragmentary perspective view of a portion of the reel support frame.

A water driven turbine 34 is mounted on the A-frame support member 24 and such turbine has an inlet pipe 35 communicating with the interior of the manifold 29 below the butterfly valve 32 and an outlet pipe 36 communicating with the interior of the manifold 29 above the butterfly valve. When the handle is in the position shown in full lines in FIG. 3, the butterfly valve is fully closed and all of the water is diverted through the turbine 34 to drive the turbine, after which the water is reintroduced into the manifold 29 and passes to the hose. When the handle 33 is in the position shown in dotted lines in FIG. 3, the butterfly valve 32 is fully open and substantially all of the water flows directly through the manifold to the hose.

Figure 7:
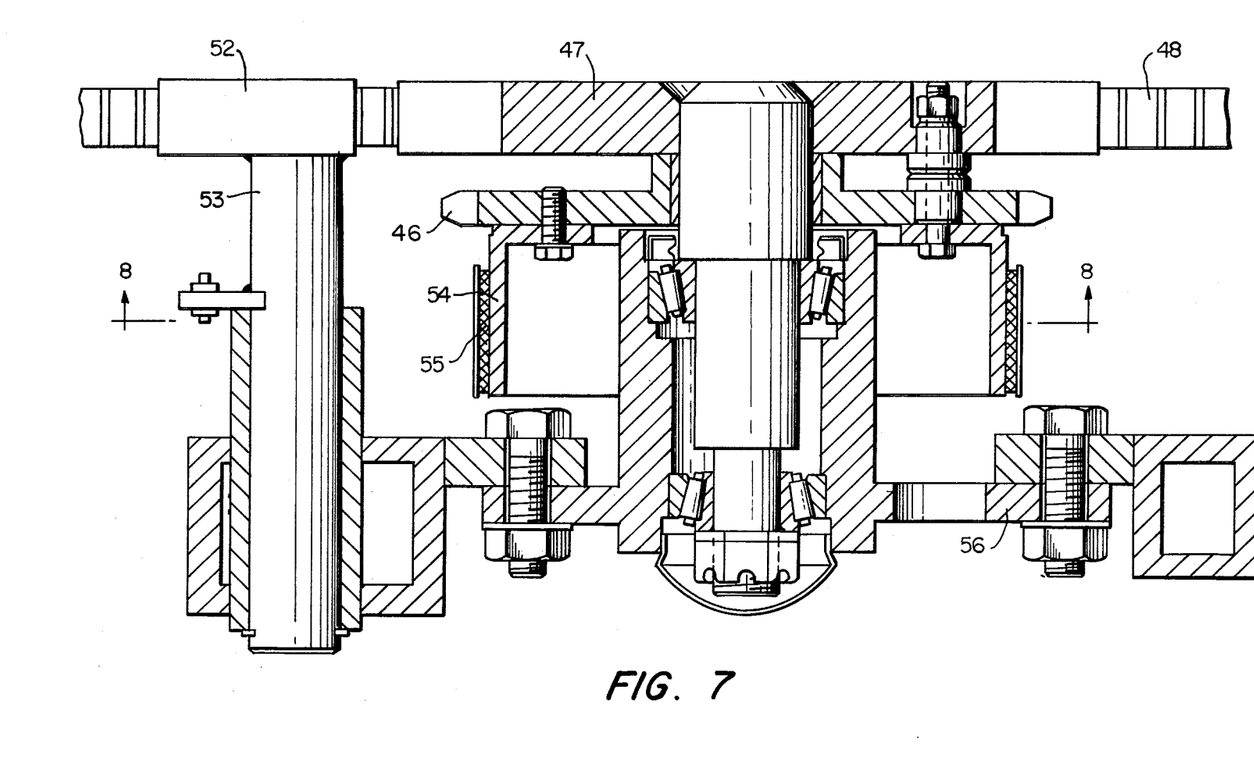
FIG. 7 is an enlarged sectional view taken on the line 7—7 of FIG. 6.
Figure 8:
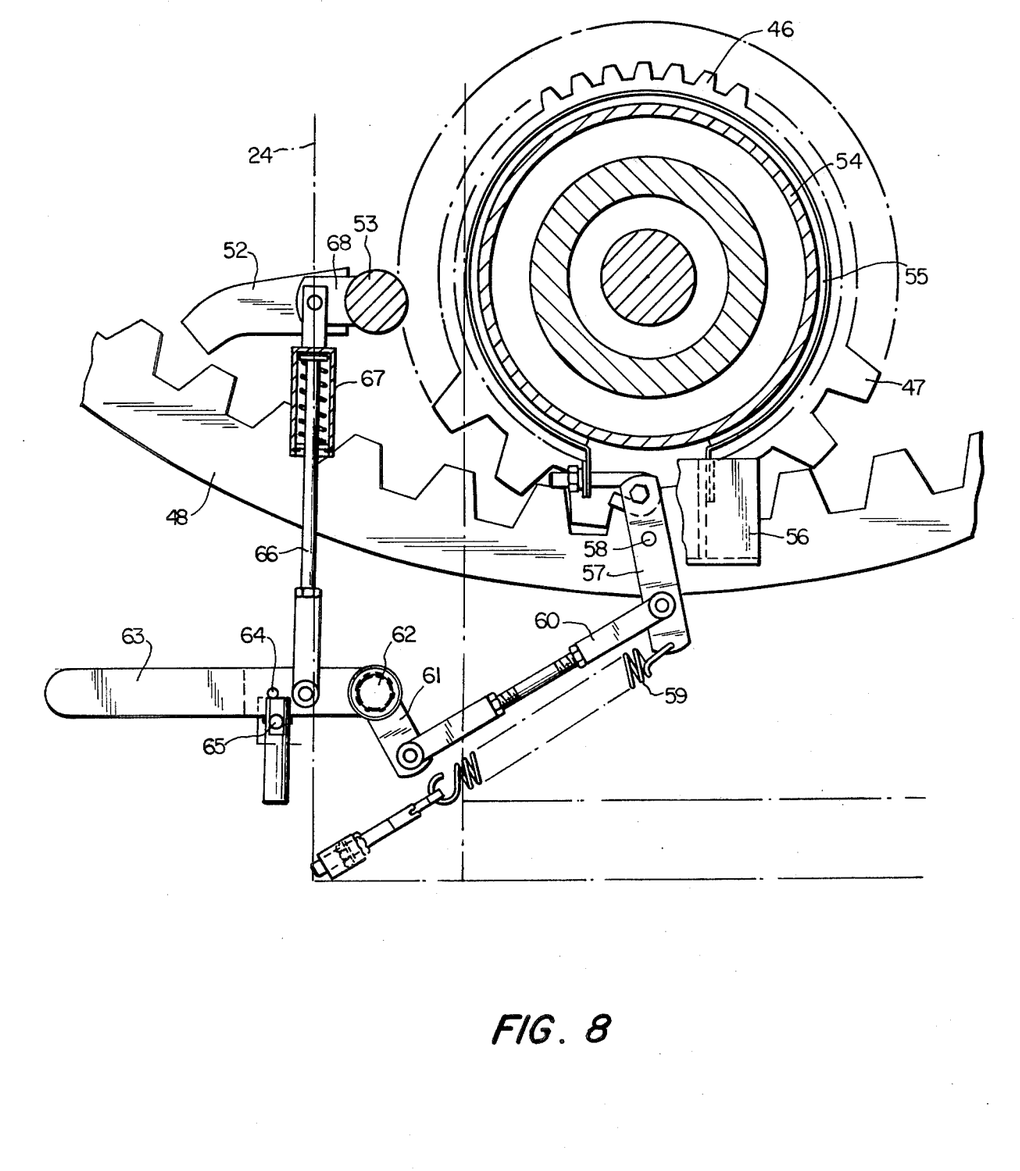
FIG. 8 is a sectional view taken on the line 8—8 of FIG. 7.

The turbine 34 has an output shaft 37 on which a pulley 38 is mounted and such pulley drives a belt 39 connected to a driven pulley 40 which is mounted on an input shaft 41 of a gear box 42. An output shaft 43 of the gear box drives a sprocket 44 which engages a chain 45 and such chain in turn is connected to a driven sprocket 46. As illustrated best in FIG. 7, the driven sprocket 46 is connected to a pinion or spur gear 47 which meshes with a ring gear 48 mounted adjacent to the periphery of the reel 27. The pulleys 38 and 40 may be either fixed or adjustable so that the speed of rotation of the reel 27 may be controlled by the pressure of the water passing through the turbine 34 or by setting the adjustable pulleys in a desired position.

A pawl 52 is mounted on a shaft 53 and normally engages the ring gear 48 so that the reel 27 can rotate in one direction only as long as water under pressure is passing through the hose 28. When the hose is being discharged from the reel, it is desirable to apply a frictional force to the reel to prevent any backlash in the hose. In order to do this a brake drum 54 is mounted on the driven sprocket 46 and a brake band 55 substantially surrounds such drum. One end of the brake band is firmly attached to a brake housing 56 carried by the A-frame support member 24, and the opposite end of such brake band is connected to one end of a lever 57 which is pivotally supported intermediate its ends by a pivot 58 carried by the housing 56. The other end of the lever 57 is attached to one end of a spring 59 the opposite end of which is secured to the A-frame support member 24 in a manner to normally urge the brake band into intimate engagement with the brake drum 54.

To release the brake band 55, one end of a link 60 is connected to the lever 57 adjacent to the spring 59 and the other end is connected to a bell crank 61 swingably mounted on the A-frame support member 24 by a pivot 62 intermediate its ends. The opposite end of the bell crank defines an operating handle 63 and such handle has an opening 64 which receives a locking pin 65 carried by the A-frame support member 24 to lock the handle 63 in the lowermost position. In the lower most position the link 60 moves the lever 57 against the tension of the spring 59 to move the brake band 55 out of engagement with the drum 54.

When the brake band 55 is applied to the brake drum 54 at the time that the hose is to be unwound from the reel, it is necessary to move the pawl 52 out of engagement with the ring gear 48 so that the reel may rotate in a reverse direction. In order to do this, a connecting link 66 is pivotally mounted at one end on the operating handle 63 and the opposite end of such link is received within a spring loaded pawl override housing 67 and such housing in turn is swingably connected to an ear 68 carried by the pawl shaft 53. With this construction the pawl 52 is raised out of engagement with the ring gear 48 when the brake band is applied to the brake drum and the operating handle 63 is in the raised position. When the operating handle is lowered and locked by the locking pin 65, the brake bank is removed from the drum and simultaneously the pawl 52 is pivoted into engagement with the ring gear 48. However, due to the spring loaded pawl override 67, the pawl 52 can pivot upwardly against the tension of the spring override 67 and pass over the teeth of the ring gear when the ring gear is being driven by the pinion 47.

Figure 11:
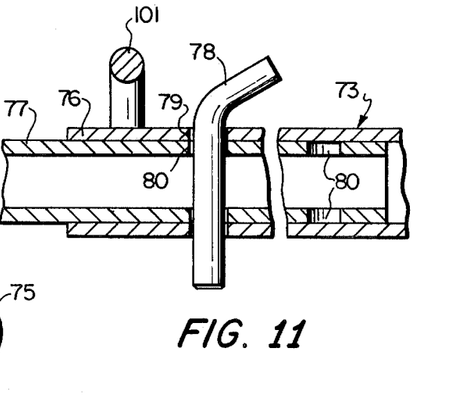
FIG. 11 is an enlarged fragmentary sectional view on the line 11—11 of FIG. 9.
Figure 12:
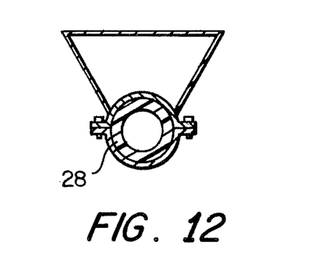
FIG. 12 is an enlarged sectional view on the line 12—12 of FIG. 9.

The free end of the hose 28 is attached to a water gun 71 carried by a travelling carriage 72. The carriage includes a frame 73 mounted on side bars 74 which are supported by ground-engaging wheels 75. The frame 73 includes telescoping portions 76 and 77 with the portion 77 being slidably received within the portion 76 to provide for a lateral adjustment of the side bars 74. The telescoping portions 76 and 77 are secured in adjusted position by a pin 78 (FIG. 11) which passes through aligned openings 79 and 80. The water gun 71 is provided with an oscillating nozzle 81 of conventional construction which normally moves slowly through an arc of 180° to 200° rearwardly of the carriage and then rapidly returns to the beginning of the sweep.

It is desirable to maintain the center of gravity of the carriage 72 as low as possible for stability and normally the weight of the water within the extended hose will cause the hose to rest on the ground and therefore the lower end of the water gun normally is located closely adjacent to the ground. However, when the hose is drawn onto the reel 27, the carriage is moved toward the reel and as the carriage approaches the reel it is desirable to raise the water gun a limited amount to prevent tilting of the carriage.

Figure 10:
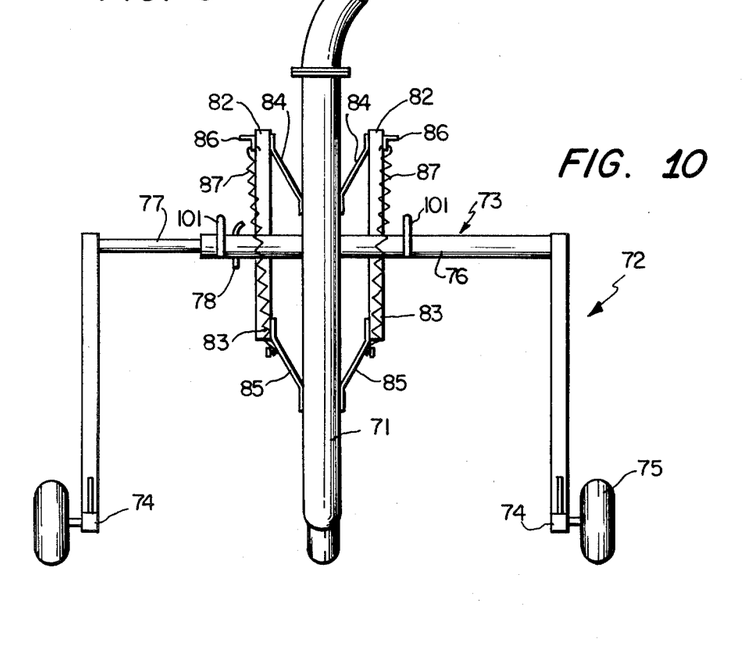
FIG. 10 is a rear elevational view of the carriage.

With particular reference to FIG. 10, on order to raise the water gun, a pair of upright posts 82 are mounted on the telescoping portion 76 and a pair of depending posts 83 also are mounted on the telescoping portion generally in alignment with the posts 82. A first pair of arms 84 are pivotally mounted at one end to the posts 82 and at the opposite end to the water gun 71, and a second pair of arms 85 are pivotally mounted at one end to the depending posts 83 and at the oppsite end to the water gun. The arms 84 and 85 are in generally parallel relationship with each other at all times. A lug 86 is mounted on each of the upright posts 82 and each of such lugs receives the ends of springs 87 the opposite ends of which are connected to the lower arms 85. With this construction, as the carriage approaches the reel and the hose 28 is lifted by the reel, the weight of the hose is relieved and the springs 87 urge the water gun 71 upwardly with the arms 84 and 85 providing a parallelogram motion while the water gun remains substantially in a vertical plane so that the spray pattern remains the same.

When the carriage 72 is positioned adjacent to the vehicle 15 and the reel 27, it is important to stop the rotation of the reel automatically even though water under pressure continues to flow through the hose for sprinkling purposes. This is done by providing a stop 88 on the hose adjacent to the carriage and providing a pivoted frame 89 (FIG. 3) mounted on a pair of rearwardly extending bars 90 carried by the support members 24 and 25. Normally a spring 91 maintains the pivoted frame 89 in generally upright position, as illustrated in full lines in FIG. 3; however, when the stop 88 engages a lower crossbar 92 of the pivoted frame, such frame is moved to the position shown in dash lines in FIG. 3.

The upper end of the pivoted frame is connected to one end of a cable 93 and such cable passes through a guide tube 94 attached to the support member 24. The opposite end of the cable 93 is connected to one end of the butterfly valve operating handle 33 so that when the upper end of the pivoted frame 89 is moved rearwardly, the cable 93 pulls the handle 33 to the position shown in dash lines in FIG. 3 in which position the butterfly valve 32 is fully open and substantially all of the water passes through the manifold 29 to the hose. Since substantially all of the water is passing through the manifold, operation of the turbine 34 ceases and the reel 27 remains in fixed position. In the event that the hose 28 is wound incorrectly on the reel 27 and exceeds the outer limits thereof, such hose engages an upper crossbar 95 and operates the pivoted frame 89 to stop rotation of the reel.

Figure 1:
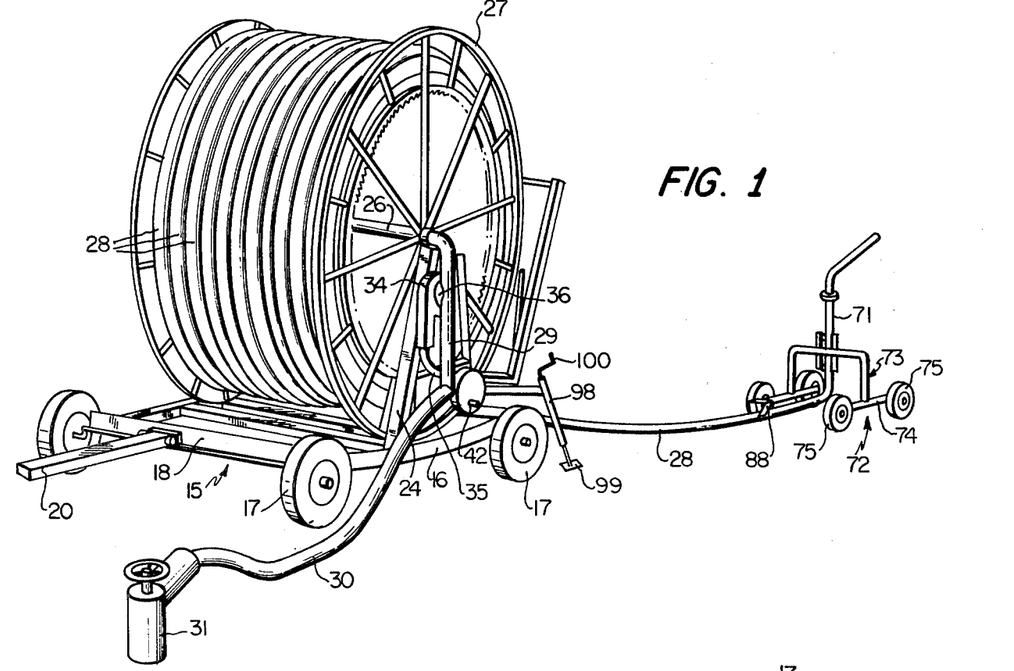
FIG. 1 is a perspective view illustrating one side of the apparatus in use.
Figure 2:
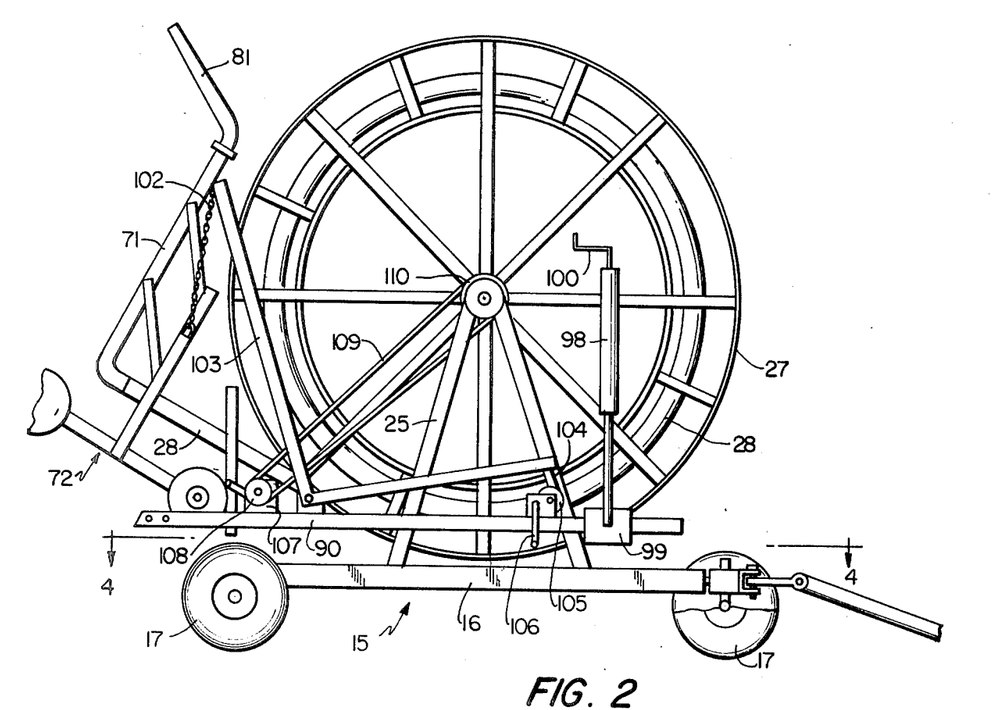
FIG. 2 is a side elevational view of the other side illustrating the apparatus in position for travel.

When the apparatus is in operation, a pair of adjustable stabilizers 98 are mounted on the outer ends of the bars 90 and each of such stabilizers is provided with a pad 99 for engaging the ground and providing support for the reel support frame 22. As illustrated in the drawings, the stabilizers 98 are of the screw type having an operating crank 100; however, it is contemplated that such stabilizers could have any conventional adjustment mechanism such as a fluid operated piston, telescoping post, or the like. When the irrigation machine is to be moved from one place to another, the stabilizers 98 may be removed from the ends of the bars 90 and supported by the machine, as illustrated in FIG. 2.

When the irrigation machine is to be moved from place to place, it is desirable to lift the carriage 72 out of engagement with the ground so that the carriage is supported on the vehicle 15. In order to do this, the frame 73 of the carriage is provided with a pair of spaced loops 101 which are adapted to be selectively engaged by chains 102 carried by a lift frame 103 pivotally mounted on the bars 90 (FIG. 2). At least one side of the lift frame is L-shaped and the forwardly extending leg of the lift frame is connected to a cable 104 carried by a winch 105 on the reel support frame 22. The winch 105 is operated by a hand crank 106 and may be locked in position in any convenient manner (not shown).

In order to wind the hose evenly on the reel, a conventional reversing screw mechanism is provided within a housing 107 which includes a travelling member (not shown) engageable by the hose and movable from side to side of the reel by the reversing screw. The reversing screw is driven by a sprocket 108 which in turn is driven by a chain 109 from a sprocket 110 mounted on the shaft 26 so that the travelling member of the reversing screw is moved only when the reel 27 is rotated.

It is sometimes desirable to drive the reel 27 while water is not passing through the manifold 29 and the hose 28, such as when water is to be drained from the hose. In order to do this, the gear box 42 is provided with an auxiliary input shaft 111 which can be engaged by an external source of power such as the power take-off of a tractor or other propelling vehicle. During this time the input shaft 41 into the gear box is disengaged in any conventional manner as by a manually operated sliding gear and the auxiliary input shaft 111 engages only the gears necessary to drive the output shaft 43. Additionally, it is contemplated that a small internal combustion engine could be provided as optional equipment for driving the gear box 42 and rotating the reel 27 without water passing through the turbine 34.

In the operation of the device, the vehicle 15 is moved to a position adjacent to a source of water under pressure, after which the reel support frame 22 may be rotated around the track 21 so that the axis of the reel 27 is perpendicular to the proposed path of movement of the carriage 72, after which the stabilizers 98 are extended so that the pads 99 engage the ground to support the reel. In this position the operating handle 63 is released from the locking pin 65 so that the brake band 55 is moved into intimate engagement with the brake drum 54 and simultaneously the pawl 52 is moved out of engagement with the ring gear 48. Thereafter a propelling vehicle such as a tractor or the like is hooked to the carriage 72 and pulls the carriage away from the vehicle 15, while the hose 28 is being unwound from the reel.

The carriage is moved away from the vehicle 15 to a desired position or until the hose 28 is substantially entirely unwound, which in the present invention may be approximately 1320 feet (402.3 m), after which the carriage is released from the propelling vehicle. In this position the operating handle 63 is locked by the pin 65 and releases the brake 55 and moves the pawl 52 into engagement with the ring gear. Thereafter the handle 33 of the butterfly valve 32 is moved to a desired position and water under pressure is introduced into the manifold 29. At least a portion of the water is diverted through the turbine 34 to drive the gear box 42 and rotate the reel 27 while all of the water passes through the hose 28 and is discharged from the nozzle 81 of the water gun 71. This operation continues until the carriage 72 approaches the vehicle 15 at which time the stop 88 engages the pivoted frame 89 to tilt such frame and cause the cable 93 to move the butterfly valve operating handle 33 so that all of the water flows through the manifold and is not diverted through the turbine.

I claim:

1. An irrigation apparatus comprising, a vehicle, a reel support frame carried by said vehicle, a reel rotatably mounted on said reel support frame and in spaced relationship to the earth, an elongated flexible hose carried by said reel, means for supplying water under pressure to one end of said hose, the opposite end of said hose being connected to a water gun movably mounted on a travelling carriage, parallelogram means mounting said water gun on said carriage and permitting limited movement of said water gun along a generally vertical plane, means urging said water gun toward an upper position, and means for rotating said reel in one direction to cause said hose to be wound thereon and move said travelling carriage toward said vehicle, whereby the weight of said hose and the water carried thereby normally maintain said water gun in a lowered position until said carriage is located near said vehicle and said reel supports the weight of said hose which permits said urging means to raise said water gun.

2. The invention of claim 1 including brake means for applying a frictional force to said reel when said carriage is moved away from said vehicle and said hose is being unwound.

3. The invention of claim 1 in which said means for supplying water includes a manifold carried by said reel support frame, said means for rotating said reel including turbine means having inlet and outlet pipes communicating with said manifold, and valve means in said manifold intermediate said inlet and outlet pipes to regulate the flow of water through said turbine means.

4. The invention of claim 3 including control means connected to said valve means and engageable with said carriage to interrupt the flow of water to said turbine means and stop rotation of said reel when said carriage is located near said vehicle.

5. In an irrigation apparatus having a hose reel with a hose rotatably mounted on a portable vehicle and having a water gun connected to the hose and mounted on a travelling carriage, in which the vehicle is positioned in a given location and the carriage is pulled away, unwinding the hose as it is pulled, and in which water is supplied to the hose at the reel and passes through the hose to the water gun, and means is provided for using the force of the water before it passes into the hose on the reel to rotate the reel and wind the hose thereon, thereby moving the carriage toward the vehicle, the improvement comprising, said means for rotating the reel comprising a turbine, means to bypass a portion of the water through said turbine before it enters the hose on the reel, valve means for controlling said bypass means, said reel having a ring gear, a spur gear mounted on said vehicle and in engagement with said ring gear, means for driving said ring gear from said turbine, brake means mounted to disengage and engage said spur gear selectively, pawl means selectively engageable with said ring gear for permitting said ring gear to rotate in the direction for winding said hose on said reel but preventing rotation in the opposite direction, whereby said brake means governs the rotation of said reel when the hose is being pulled off of the reel in order to avoid free rotation thereof during the paying out of said hose.

6. The invention of claim 5 including frame means pivotally mounted on said vehicle, control means connecting said frame means and said valve means for shifting said valve means to interrupt flow through said bypass and stop operation of said turbine when said frame means is engaged, and means on said hose adjacent to said water gun for engaging said frame.

7. The invention of claim 6, in which said frame has a portion engageable with the hose wrapped around said reel in the event that said hose extends radially outwardly beyond a predetermined dimension.

8. The invention of claim 5, in which said water gun is carried on a parallelogram assembly mounted on said carriage, the weight of said water gun and hose being such that the lower portion of said water gun is supported close to the ground, means biasing said water gun upwardly, the elevation of the hose on the lower wrap of said reel being higher than the elevation of the hose where it is connected to the water gun in its lowermost position, whereby when said water gun is drawn into proximity with the vehicle the parallelogram assembly and said biasing means raise said water gun generally vertically.

9. The invention of claim 5 in which said vehicle includes a circular track, said hose reel being rotatably mounted on a reel support member, and roller means rotatably mounting said reel support member on said track.

10. The invention of claim 9 including stabilizer means mounted on said reel support member and engageable with the earth to support said reel support member.

11. The invention of claim 5, including lift means pivotally mounted on said vehicle and having means for lifting and carrying said carriage during transport thereof.

12. The invention of claim 5 including link means connecting said pawl means to said brake means so that said pawl means is released from said ring gear when said brake means is applied and said pawl engages said ring gear when said brake means is released.

* * * * *